United States Patent [19]
Garcia et al.

[11] Patent Number: 5,530,663
[45] Date of Patent: Jun. 25, 1996

[54] FLOATING POINT UNIT FOR CALCULATING A COMPOUND INSTRUCTION A+B×C IN TWO CYCLES

[75] Inventors: Leslie C. Garcia; Nany H. Kollesar, both of Poughkeepsie; Huei Ling, Chappaqua, all of N.Y.

[73] Assignee: International Business Machines Corporation, Armonk, N.Y.

[21] Appl. No.: 339,115

[22] Filed: Nov. 14, 1994

[51] Int. Cl.$^6$ .................................................. G06F 7/38
[52] U.S. Cl. ........................................ 364/748; 364/736
[58] Field of Search ..................................... 364/748, 736

[56] References Cited

U.S. PATENT DOCUMENTS

| | | | |
|---|---|---|---|
| 4,792,793 | 12/1988 | Rawlinson et al. | 341/89 |
| 4,879,676 | 11/1989 | Hansen | 364/748 |
| 4,901,267 | 2/1990 | Birman et al. | 364/736 |
| 4,922,446 | 5/1990 | Zurawski et al. | 364/748 |
| 4,926,369 | 5/1990 | Hokenek et al. | 364/748 |
| 4,941,119 | 7/1990 | Moline et al. | 364/745 |
| 4,941,120 | 7/1990 | Brown et al. | 364/748 |
| 4,969,118 | 11/1990 | Montoye et al. | 364/748 |
| 4,999,802 | 3/1991 | Cocanougher et al. | 364/748 |
| 5,113,363 | 5/1992 | Orsino et al. | 364/736 |
| 5,144,570 | 9/1992 | Maher | 364/715 |
| 5,146,419 | 9/1992 | Miyoshi et al. | 364/748 |
| 5,268,856 | 12/1993 | Wilson | 364/748 |
| 5,375,078 | 12/1994 | Hrusecky et al. | 364/748 |

*Primary Examiner*—Tan V. Mai
*Attorney, Agent, or Firm*—Bernard M. Goldman

[57] ABSTRACT

A floating point arithmetic unit that executes a single compound instruction that produces the result A+B×C with A, B and C being floating point numbers. Arithmetic on the exponents of A, B and C provide a normalized result of the multiplication before the addition takes place producing a normalized result of the compound instruction. The final normalized result is identical to a result that would be obtained by executing a separate instruction for the multiply, with normalized result, followed by an add instruction with a normalized result.

7 Claims, 3 Drawing Sheets

FLOATING POINT UNIT FOR CALCULATING A COMPOUND INSTRUCTION A+B×C IN TWO CYCLES

BACKGROUND OF THE INVENTION

1. Field of the Invention

The present invention relates to a floating point arithmetic unit in a data processing system and more particularly to a unit that executes a compound instruction A+B×C in two cycles that is compatible with the result achieved by executing a multiply instruction followed by an add instruction.

2. Description of the Prior Art

Floating point arithmetic and special units for performing floating point arithmetic are well documented. Floating point numbers in digital data processing machines allow for larger numbers and more complicated scientific applications. A floating point number is comprised of an exponent portion and a mantissa portion. The mantissa portion represents the value of a number and the exponent portion reflects where the radix point is located in relation to the most significant digit of the mantissa. Each digit of a number can be either a binary bit or comprised of four binary bits to represent the value of a hexadecimal digit. Typical data processing systems have a data flow path that is 64 bits wide. An exponent is often eight binary bits and the mantissa 56 bits.

Floating point arithmetic such as multiply or add involve doing the arithmetic on the mantissa portion, but require manipulating the value of the exponent portion either before the operation or subsequent to the operation. When adding two floating point numbers the exponent portion of both operands must be equal. This involves adjusting the number with the smallest exponent by shifting the mantissa portion to the right while incrementing the exponent portion for each shift.

A multiply operation involves multiplying two mantissa portions, often with special hardware, to produce a value that has 112 binary bits. The exponent of the result will be the sum of the exponents of the two numbers.

Rounding and accuracy of floating point numbers is often involved in this arithmetic. Normalized numbers are also desired. A normalized floating point number is characterized by shifting the mantissa and adjusting the exponent by a like amount to achieve a particular value for the most significant digit of the mantissa. The most significant digit is made to have a value the opposite of the binary bit reflecting the sign of the number. The sign of a positive number is a binary 0. In this case the most significant digit of the mantissa must be a non zero. In the case of a binary mantissa the digit must be a binary 1. In the case of hexadecimal numbers, any one of the four binary bits of the hexadecimal number must be a binary 1.

The time required for doing floating point operations is always a concern. General purpose data processing systems, often with just a binary adder, would require many machine cycles. Cycles are needed to manipulate exponents, do the add or multiply, detect leading zero's in the mantissa, shift the mantissa for alignment during an add, shift a result to normalize the mantissa and adjust the exponent. As a result many inventions have been made in the past to provide special purpose hardware that allows much of the mantissa and exponent handling to be accomplished in parallel by predicting leading zero's of results and/or exponents of the result.

Many scientific applications have been found to require a function known as Multiply and Add (MAD). The function would accomplish the formula A+B×C. Early on this would be accomplished by executing a multiply instruction to obtain the result B×C. This would be followed by adding A to the result product. Even with special purpose hardware to allow for parallel handling of the mantissa and exponent, programming is complicated and the normalizing of results and alignment of operands requires many machine cycles.

The prior art has produced special purpose hardware specifically designed to execute a compound MAD instruction. This is represented by U.S. Pat. No. 4,969,118. Assisting in the execution of compound instructions MAD is a leading zero anticipator circuit described in U.S. Pat. No. 4,926,369. Both of these patents are assigned to the assignee of this invention.

The MAD execution in U.S. Pat. No. 4,969,118 is accomplished in two machine cycles and produces a normalized final result. Accuracy in scientific applications is a very important consideration. It has been found that when the MAD instruction is executed in the hardware of this patent as part of a scientific application, it may not produce a final result equal to the result obtained when the application is run with programming that includes a multiply instruction for doing B×C followed by an add instruction for adding A to the result product. This patent does not provide a normalized version of the product during the first cycle of operation that produces the representation of the B×C product.

SUMMARY OF THE INVENTION

It is an object of the present invention to provide a hardware arithmetic unit that functions in two machine cycles to produce the results of a compound instruction calling for the operation A+B×C where the operands are floating point numbers.

It is another object of the present invention to provide a hardware arithmetic unit that produces the result of a compound instruction calling for the operation A+B×C on floating point numbers where the result is a normalized floating point number equal to the result achieved by executing the simple instruction B×C with a normalized product number(P), followed by a simple instruction A+P with a normalized result.

These objects and other features and advantages are achieved in a hardware arithmetic unit that in a first cycle performs the multiplication B×C in parallel with performing logic on the exponent portions of operands A, B and C. The logic performed on the exponents produces a predicted value of the exponent portion of the product B×C. The predicted exponent value is for a normalized value of the product, and is used with the value of the exponent of operand A to align operand A with the normalized product for a following cycle of addition.

The arithmetic unit, operative in the second cycle of operation, includes adders that add operand A to the product B×C. In parallel with the addition, a leading zero's anticipator examines the operands to produce a postnomalizing shift control signal. The shift control signal is applied to the results of the addition to produce a normalized result of the operation A+B×C in an output register.

DESCRIPTION OF THE PREFERRED EMBODIMENT

Arithmetic in data processing systems using floating point numbers requires several basic functions. A floating point number is typically comprised of 64 binary bits which provides an 8-bit exponent value and a 56-bit mantissa value.

When floating point numbers are multiplied, the exponents of the two operands are added together to provide the result exponent. The mantissas are multiplied together normally in a carry save adder (CSA) tree which provides a product sum (PSUM) value and a product carry (PCARRY) value each of 112 binary bits. These two values are added together in a carry propagate adder (CPA) to produce a 56-bit product. Results of floating point operations are often normalized. That is, the most significant digit of the mantissa should be non-zero for positive numbers. This may require the result number to be shifted left to remove leading zero's. If shifting is required, the result exponent is decremented for each shift.

When floating point numbers are added, the mantissa's must be aligned. This requires the operand with the smallest exponent to be right shifted while incrementing its exponent until the two exponents are equal. These concepts will be addressed further in the description to follow of a special purpose arithmetic unit for performing the compound instruction A+B×C.

Figure 1:
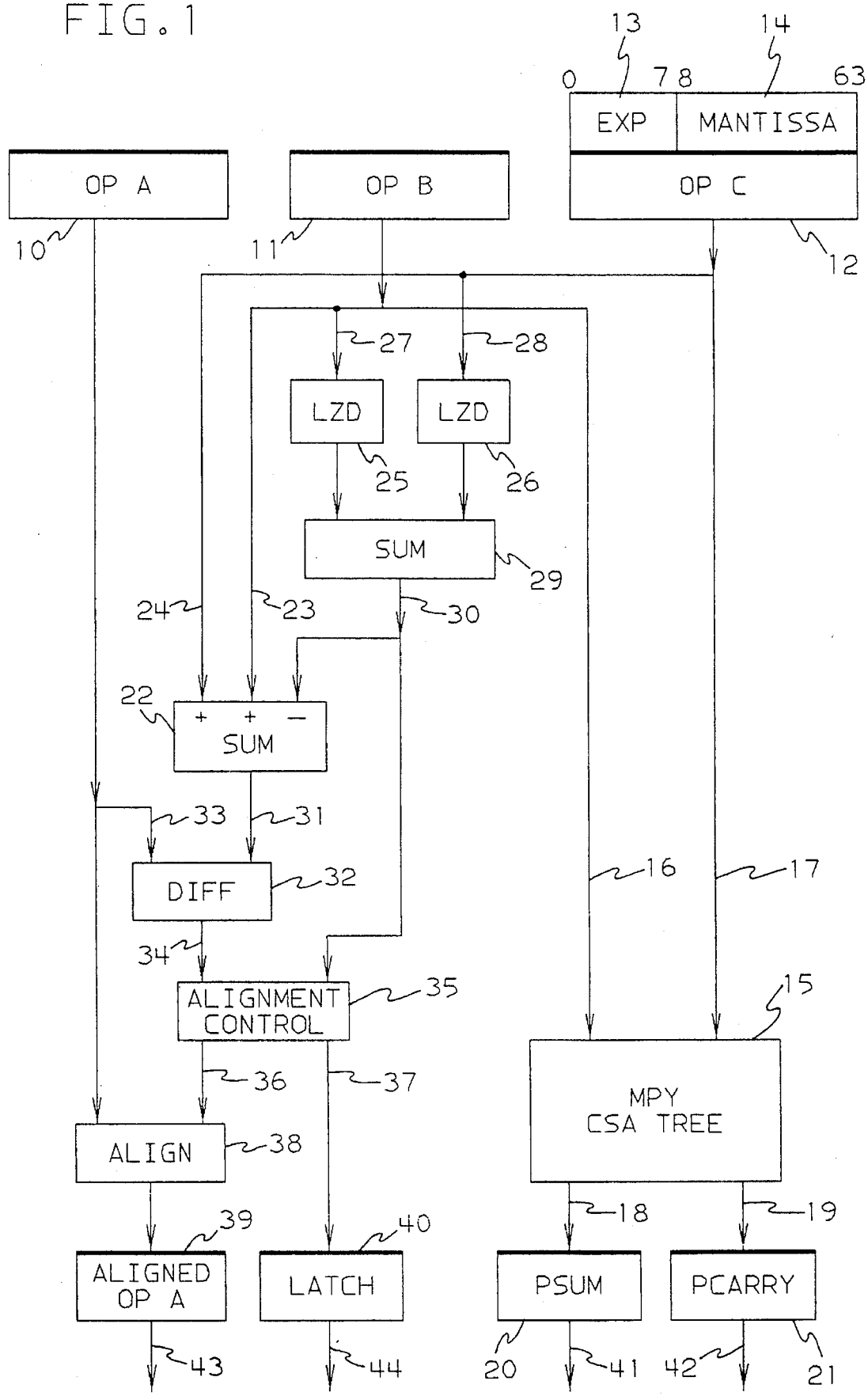
FIG. 1 is a logic block diagram of a floating point arithmetic unit used in a first machine cycle to start the operation A+B×C.
Figure 2:
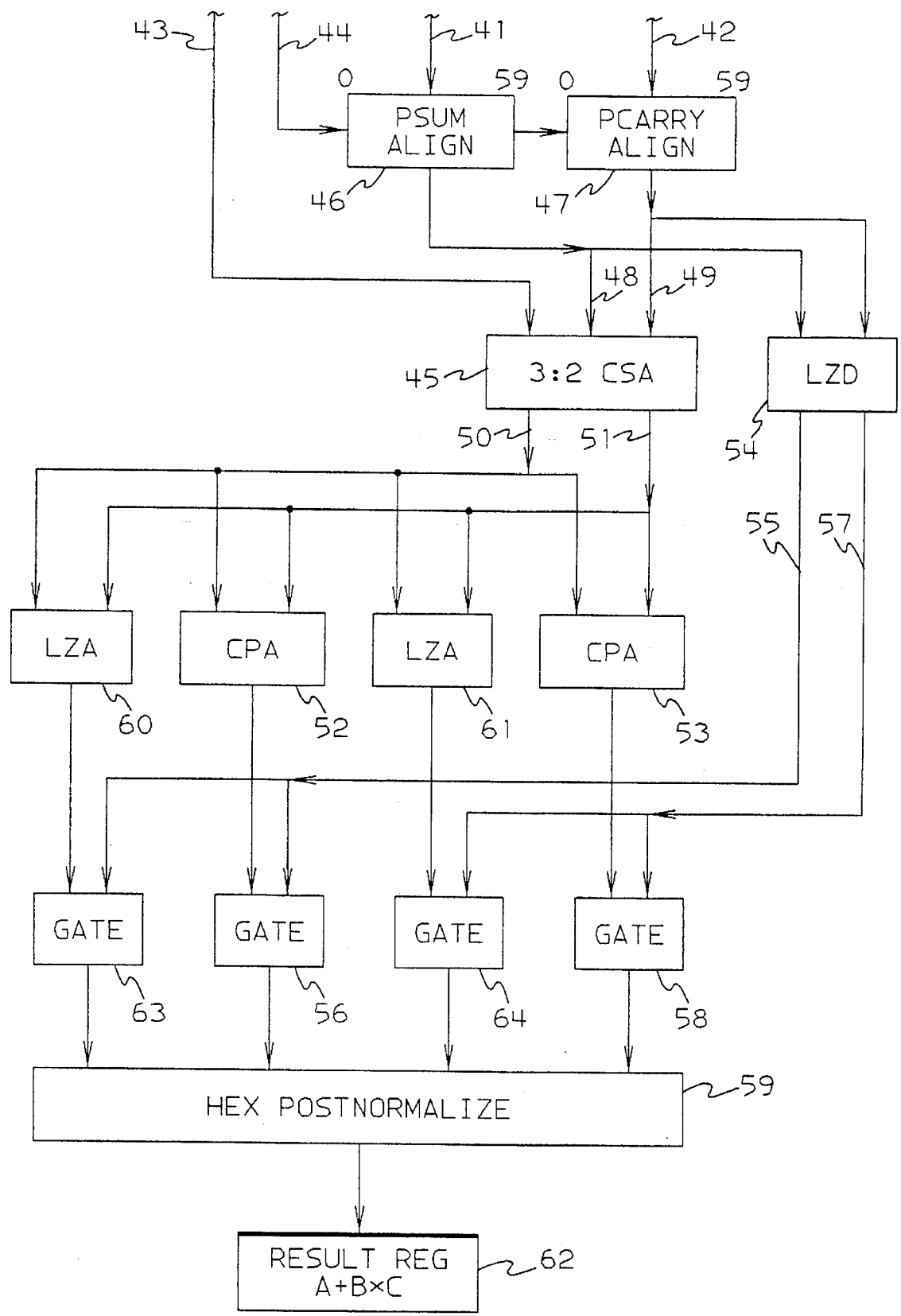
FIG. 2 is a logic block diagram of a floating point arithmetic unit used in a second machine cycle to complete the operation A+B×C.

The preferred embodiment of the present invention produces the result of the compound instruction A+B×C on 64-bit operands. The discussion will refer to digits in the hexadecimal form so the mantissa will be comprised of 14 hexadecimal digits. FIG. 1 shows the logic performed in a first machine cycle and FIG. 2 shows the logic performed in the second machine cycle.

In FIG. 1, operands A, B and C are stored in respective registers 10, 11 and 12. Each operand is comprised of an 8-bit exponent (EXP) portion 13 and a 14 hexadecimal digits mantissa 14. The mantissa portion 14 of operands B and C are transferred to a multiply carry save adder tree (MPY CSA TREE) 15 on lines 16 and 17. The result of B×C is output from the MPY CSA TREE 15 on lines 18 and 19 in the form of a product sum (PSUM) value and a product carry (PCARRY) value each comprised of 28 hexadecimal digits. The PSUM on line 18 is stored in a register 20 and PCARRY on line 19 is stored in register 21. Registers 20 and 21 store these values at the completion of the first machine cycle.

The remainder of FIG. 1 is operative during the multiply operation on B and C and is characterized as exponent logic dealing with producing a normalized final result including an exponent as well as controlling the alignment of operand A with the results of the B×C multiply operation.

The SUM logic 22 is effective to predict the exponent of a normalized value of the mantissa produced for the product B×C. During a normal multiply, the exponent portion 13 of the result will be the sum of the two exponents. SUM logic 22 performs this function by receiving on lines 23 and 24 the exponent portion 13 of operands B and C. To produce a normalized product of B×C, the product is shifted left by the number of leading zero's and the exponent decremented until the most significant digit of the product is non-zero.

The predicted exponent of the product B×C will be affected by the number of leading zero's of the operands B and C. Leading zero detectors (LZD) 25 and 26 receive the mantissa portion 14 of operands B and C on lines 27 and 28. The outputs of LZD's 25 and 26 are applied to SUM 29 to indicate the maximum number of leading zero's that would result from the B×C operation. Depending on the result of the operation B×C, the number of leading zero's might be one less than the maximum. Therefor the output 30 of SUM 29 will be one less than the maximum.

The output 30 of SUM 29 is applied to SUM 22 to be subtracted from the sum of the exponents that would result from the multiply operation of B and C. The output 31 of SUM 22 now represents the predicted exponent of a normalized product of the operation B×C. Depending on the result of the multiply, this value of the predicted exponent may be in error by one. This possibility is accounted for in the second cycle of operation and will be subsequently described.

DIFF 32 determines the relative size of the exponent portion 13 of operand A in register 10 received on line 33 and the predicted exponent of the product B×C. This value on line 34 determines the amount of shift required in the mantissa value of the smallest exponent to provide proper alignment of the product values in PSUM register 20, PCARRY register 21, and operand A.

ALIGNMENT CONTROL 35 receives the output 34 from DIFF 32 and the output 30 from SUM 29. The function of ALIGNMENT CONTROL 35 is to determine the relative sizes of the predicted exponent of B×C and operand A. The outputs 36 and 37 will control shifting of operand A or the PSUM and PCARRY representations of the product B×C. If the exponent portion 13 of operand A is smallest, ALIGN circuit 38 will shift the mantissa portion 14 of operand A to the right by an amount determined by DIFF 32. This shifted value of operand A will be stored in the ALIGNED OP A register 39 at the end of the first cycle.

The output 37 of ALIGNMENT CONTROL 37 is latched in a register LATCH 40 at the end of cycle one for use in cycle two to shift the PSUM value on line 41 and PCARRY value on line 42. The output 43 of ALIGNED OP A register 39 and output 44 of LATCH 40, along with the outputs 41 and 42 representing the product B×C, will be discussed in connection with second cycle operations to be described in connection with FIG. 2.

As shown in FIG. 2, the addition of operand A to the product B×C is started in a second cycle at a three input carry save adder (CSA) 45 which receives aligned operand A on line 43. B×C product alignment from cycle one is effected at PSUM ALIGN circuit 46 and PCARRY ALIGN circuit 47 which receive outputs 41 and 42 respectfully from FIG. 1. Alignment control is received on line 44 from LATCH 40 of FIG. 1.

There are two cases to consider in the alignment of operand A with PSUM 41 and PCARRY 42 before starting the addition in CSA 45. DIFF 32 provides the determination of which case is in affect.

Case 1 is the situation where the exponent of operand A is smaller than the predicted exponent of the B×C product. In this case, ALIGN 38 of FIG. 1 would have shifted the mantissa portion of operand A to the right by the proper amount. PSUM ALIGN 46 and PCARRY ALIGN 47 will shift left the outputs 41 and 42 respectively by one less than the maximum number of leading zero's determined by the SUM circuit 29. This leaves the zero/non-zero value of the most significant digit in doubt of what is now considered a normalized value of the B×C product. This doubt will be resolved with a subsequent description. CSA 45 is now prepared to receive operand A on line 43, aligned with a normalized value of PSUM on line 48, and a normalized value of PCARRY on line 49.

Case 2 occurs when the predicted exponent of the product B×C is smaller than the exponent of operand A. In this case the PSUM ALIGN circuit 46 and PCARRY ALIGN circuit 47 would normally shift these values to the right by the amount of the difference determined by DIFF 32 of FIG. 1. The amount of the shift right will be modified by the left shift amount that would have occurred to normalize the values. This amount was determined by the output 30 of the SUM circuit 29 summing the number of leading zero's of the original operands B and C. The actual value of the most significant digit of the PSUM and PCARRY values 41 and 42, which was in doubt in case 1, is now not a problem. The digit, whatever its value will enter into the addition taking place with operand A.

CSA 45 produces a sum output 50 and a carry output 51, each of 60 binary bits. As with any use of a carry save adder, the final sum is obtained by applying the outputs 50 and 51 to a carry propagate adder (CPA). The doubt raised about the most significant digit of the normalized product B×C represented by the PSUM input 41 and PCARRY input 42 in the case 1 situation above is resolved by applying the CSA 45 outputs 50 and 51 to two CPA's 52 and 53. CPA 52 receives binary bits 0–55 of the outputs 50 and 51, and CPA 53 receives binary bits 4–59.

In the case 1 situation above, where the right-shifted product B×C during alignment puts all the product bits within the 56 bits of operand A, the output of CPA 52 will be selected for forming the final result of A+B×C.

The case 2 situation requires the determination of the zero/non-zero value of the most significant digit of the B×C product. It is recalled that a normalizing shift of the product B×C was based on one less than the sum of the number of leading zero's of the original operands B and C determined in the SUM circuit 29 of FIG. 1. Leading zero detector (LZD) 54 receives the outputs 48 and 49 of the ALIGN circuits 46 and 47 and determines whether or not the most significant digit is in fact a non-zero value. If it is non-zero, LZD 54 will produce an output 55 effective at a GATE 56 to select the binary bits 0–55 output from CPA 52. If the most significant bit on outputs 48 and 49 is zero, meaning the original normalizing shift was not proper, binary bits 4–59 reflect the proper output. Output 57 from LZD 54 will be effective at a GATE 58 to select the output of CPA 53 as the final result of the A+B×C operation.

The final result selected through either GATE's 56 or 58 will be subjected to a HEX POSTNORMALIZE circuit 59. That is, the result A+B×C must be made to have a non-zero digit in the most significant digit. If postnormalizing were effected after the additions of CPA's 52 or 53, too much extra time would be involved. In parallel with the additions taking place in CPA's 52 and 53, leading zero anticipators (LZA) 60 and 61 will be examining the values on the outputs 50 and 51 of CSA 45 to resolve the amount of shift required in the POST NORMALIZE circuit 59 to produce a normalized result in the RESULT REG A+B×C 62. GATE's 63 and 64, responding to the outputs 55 and 57 of LZD 54, will select the proper outputs of LZA's 60 and 61.

Figure 3:
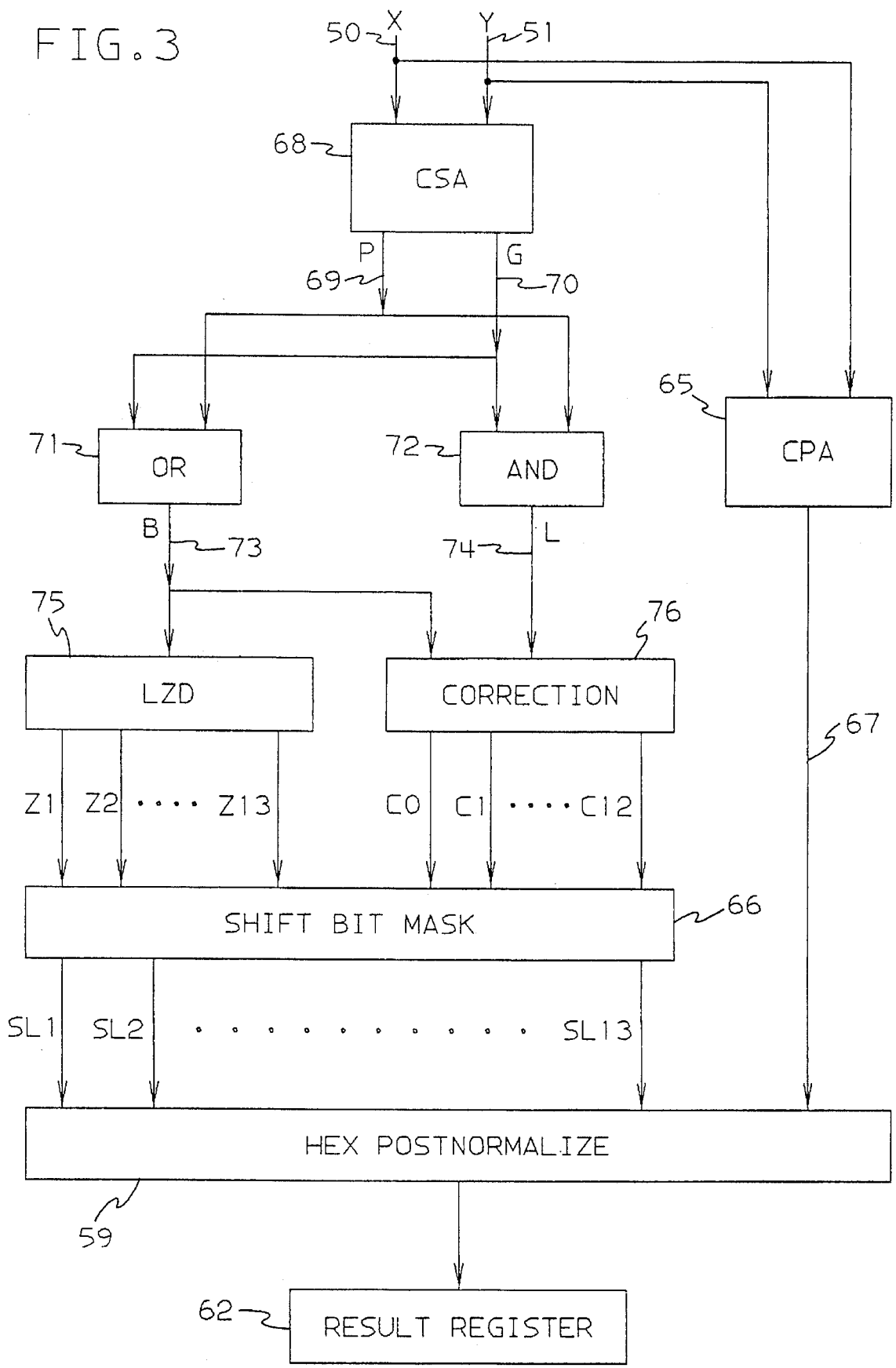
FIG. 3 is a logic block diagram of a leading zero's anticipator used as part of the unit described in FIG. 2.

The logic of either LZA 60 or 61 of FIG. 2 is shown in more detail in FIG. 3. The outputs 50 and 51 of CSA 45 of FIG. 2 are shown as inputs to either LZA 60 or 61. CPA 65 represents either CPA 52 or 53 of FIG. 2. HEX POSTNORMALIZE circuit 59 will receive the output of a SHIFT BIT MASK circuit 66. Only one of the outputs SL1 through SL13 will be produced depending on the need to shift the hex digits of the output 67 of CPA 65 to produce a normalized result. The logic for producing the SHIFT BIT MASK 66 will now be described.

CSA 68 receives the inputs 50 (X) and 51 (Y) as follows:

$$X = x1 + x2 + x3 + x4 + x5 + \ldots xN$$

$$Y = y1 + y2 + y3 + y4 + y5 + \ldots yN$$

The outputs 69 (P) and 70 (G) of CSA 68 can be expressed as:

$$P = p1 + p2 + p3 + p4 + p5 + \ldots pN$$

$$G = g0 + g1 + g2 + g3 + g4 + g5 + \ldots g(N-1)$$

Where
pN=EXCLUSIVE OR of (xN,yN)
gN=AND of x(N+1) ,y(N+1)
The P 69 and G 70 outputs can be added in a special way in OR circuit 71 and circuit 72 to form B 73 and L 74 outputs as follows:

$$B = b1 + b2 + b3 + b4 + b5 + \ldots bN \quad \text{Eq. 1A}$$

$$L = l1 + l2 + l3 + l4 + l5 + \ldots lN \quad \text{Eq. 1B}$$

Where
bN=OR of pN,gN
lN=AND of pN,gN

L in Eq. 1B suggests that carry generate (L) bit positions can be scanned from left to right until the first carry (L) bit=1 is encountered. The bit positions (in B) covered by this carry (Call this a carry substring) cannot be affected by additional L carries to the right. An example follows.

Consider the following 6 HEX digits (H0–H5) of X and Y and the development of P, G, B and L and the sum by two methods: The B/L carry substring algorithm and normal text book binary addition.

|       | H0   | H1   | H2   | H3   | H4   | H5   |                      |
|-------|------|------|------|------|------|------|----------------------|
| X =   | 0000 | 0000 | 1111 | 1010 | 1101 | 0101 |                      |
| Y =   | 0000 | 0000 | 0000 | 0111 | 0110 | 0111 |                      |
| P =   | 0000 | 0000 | 1111 | 1101 | 1011 | 0010 | (X EX OR Y)          |
| G =   | 0000 | 0000 | 0000 | 0100 | 1000 | 1010 | (X AND Y left shift 1) |
| B =   | 0000 | 0000 | 1111 | 1101 | 1011 | 1010 | (P OR G)             |
| L =   | 0000 | 0000 | 0000 | 0100 | 1000 | 0010 | (P AND G)            |
| SUM = | 0000 | 0001 | 0000 | 0010 | 0011 | 1100 | (CPA 65 add)         |
| SUM = | 0000 | 0001 | 0000 | 0010 | 0011 | 1100 | (B/L substring)      |

B and L are almost identical to P and G except for the following: When possible, corresponding L=1 and B=0 bit positions have been swapped. The number of lead zero's in B is almost the same as the number of lead zero's in the sum X+Y. B incorrectly predicted a zero in H1. The non-zero H1 was caused by a carry into H1 from the right. The carry originated from the L=1 in H3 propagating through the continuous carry substring (6 bits) of H3 and H2 into H1 of B. Even though other carries exist to the right of the one in H3 (H4 and H5 have one each) they will not affect the 6-bit carry substring of H3/H2. Stated another way, a carry gets generated when both pN AND gN equal 1, but it will not be propagated into another carry position since the AND of pN, g(N−1) always is 0.

A simple rule for finding the sum of X+Y is: for every L=1 bit position, compliment all B bit positions above and to the left of the L=1 bit position down to and including the first B=0 bit encountered. Repeat this process for all L=1 bits. This process can be modified to determine the number of leading zero's in a sum without knowing the exact sum.

The modified rule for correcting the wrongly predicted digit: scan L from left to right, look for the first L=1 bit and compliment the corresponding B carry substring. This will correct the sum digit in question (H1 in the example). There is no need to continue scanning to the right since additional carries cannot affect sum digits to the left of the first carry. L=1 bits identify independent carry substrings of B.

A correction signal for each HEX digit position can be written as follows:

$$C(x-1) = b0 \cdot 10 + \\ (b0 \cdot b1) \cdot 11 + \\ (b0 \cdot b1 \cdot b2) \cdot 12 \\ (b0 \cdot b1 \cdot b2 \cdot b3) \cdot 13 + \\ (b0 \cdot b1 \cdot b2 \cdot b3) \cdot C(x+1)$$   Eq. 2

Where: x identifies a HEX digit location $C(x-1)$ is correction to HEX digit $x-1$ $b0, b1, b2, b3$ are the 4 corresponding B bits associated with HEX digit x $10, 11, 12, 13$ are the 4 corresponding L bits associated with HEX digit x $C(x+1)$ is correction in from HEX digit $x+1$ In Eq. 2 the first 4 correction components are locally generated by HEX digit x while the fifth one is propagating a correction coming in to the digit x position from HEX digit x+1.

$C(x-1)$ can be generalized as follows:

$$C(x-1) = CGx + CPx \cdot C(x+1)$$   Eq. 3

Where: x identifies a HEX digit location $C(x-1)$ is correction to HEX digit $x-1$ $CGx$ is a correction generated locally by digit x $CPx$ is a correction propagating situation $C(x+1)$ is correction in from HEX digit $x+1$ The correction signal coming into any HEX digit position can be solved by successive substitutions of Eq. 3 for all HEX digits. In general, any Hex digit correction is of the form:

$$C(x-1) = CGx + CPx \cdot CG(x+1) + CPx \cdot CP(x+1) \cdot CG(x+2) + CPx \cdot CP(x+1) \cdot CP(x+2) \cdot CG(x+3) \ldots$$   Eq. 4

In the example, B indicated that the sum might have up to 2 leading zero's (H0 and H1). Since B is a predictor but can be off by one, a test is made on HEX digit 1 (H1) to see if a correction signal is coming into it. The logic required for C1 (correction 1) is as follows:

$$C1 = CG2 + CP2 \cdot CG3 + CP2 \cdot CP3 \cdot CG4 + \\ CP2 \cdot CP3 \cdot CP4 \cdot CG5 + \ldots + CP2 \cdot CP3 \cdot CP4 \cdot \\ CP5 \cdot CP6 \cdot CP7 \cdot CP8 \cdot CP9 \cdot CP10 \cdot CP11 \cdot CP12 \cdot CG13$$

Assumes 14 HEX digits of X and Y

The logic and equations just discussed are implemented in a leading zero detector (LZD) 75 and CORRECTION circuit 76 shown in FIG. 3.

LZD 75 detects the number of leading zero's in B. The logic is standard. The 13 outputs (Z1–Z13) corresponding to the number of lead zero's in B, e.g. Z1=1 indicates 1 leading zero, Z13 indicates 13. Z1 through Z13 are orthogonal in that no more than 1 can be on at the same time. All off indicates no leading zero's in B. Let Bx identify any GEX digit of B, and b0, b1, b2 and b3 the 4 bits of that HEX digit. 14 signals are generated (B0–B13) corresponding to each HEX digit indicating if it is non-zero.

$$Bx = (b0 + b1 + b2 + b3)x$$   Eq. 5

Where x identifies a HEX digit position

Bx is a particular HEX digit of B

Bx=1 if any bits in that digit=1

The number of lead zero's Zn detected by LZD 75 can be found using the Bx signals in Eq. 5 as follows:

$$Z1 = (NotB0) \cdot B1 \\ Z2 = (NotB0) \cdot (NotB1) \cdot (B2)$$   Eq. 6

.
.
.

$$Z13 = (NotB0) \cdot (NotB1) \cdot (NotB2) \ldots (NotB12) \cdot (B13)$$

The SHIFT BIT MASK circuit 66 uses the Zx signals generated by LZD 75 and a corresponding correction signal Cx from CORRECTION circuit 76 to determine the exact left shift SLx amount. The mask has 13 positions corresponding to the 13 possible shift amounts to normalize the 14 HEX digit sum output 67 from CPA 65. If Z1 is on indicating B has 1 leading zero, then SL1 will be set to one if and only if the correction signal to HEX digit 0 is off (C0=0). If C0=1 then SL1=0. SLx can be expressed as:

$$SLx = Zx \cdot NotC(x-1) + Z(x+1) \cdot C(x-1)$$

Where x identifies a HEX digit position

Zx=LZD of B signal

SLx=Shift mask bit x

Cx=Correction signal

Summarizing the discussion of FIG. 3 with reference to FIG. 2, as each of CPA's 52 and 53 are producing the final results of the compound instruction A+B×C, LZA's 60 and 61 are performing the logic of FIG. 3 to effect any left shifting required of the results to produce a normalized final result of the operation A+B×C at the completion of the second machine cycle.

Further summarizing the purpose of the present invention, the normalizing and alignment performed on the B×C product and A operand at the completion of the first machine cycle insures that the compound instruction A+B×C will have the same result as executing a multiply instruction B×C with normalizing, followed by an add instruction of operand A with the B×C results of the multiply instruction.

While we have illustrated and described the preferred embodiment of the invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. Apparatus in a data processing system for performing the compound floating point instruction (A+B×C) during a first and a second machine cycle, said apparatus comprising:

register means for storing each of floating point operands A, B and C, each of said operands being comprised of an exponent portion and a mantissa portion;

first arithmetic means connected to each of said register means for producing an output value of the mantissa portion of operand A aligned with a product output comprising the mantissa portion of the product B×C; and second arithmetic means connected to said output value of the mantissa portion of operand A, and including product alignment and normalizing means connected to said product output of said first arithmetic means for producing a normalized output of the mantissa portion of the value A+B×C.

2. Apparatus in accordance with claim 1 wherein said apparatus further includes:

multiply means connected to the mantissa portion of said register means storing operands B and C for producing a product output representing the mantissa portion of the operation B×C;

exponent logic means connected to the exponent portion of said register means storing operands A, B and C for producing an alignment control output signal;

operand A alignment means connected to said alignment control output signal, and connected to the mantissa portion of said register means storing operand A for providing an output value of the mantissa portion of operand A aligned with a normalized representation of said product output of said multiply means; and means connecting said alignment control output signal to said product alignment and normalizing means of said second arithmetic means.

3. Apparatus in accordance with claim 2 wherein said exponent logic means includes:

means for detecting the number of leading zero's in each of the mantissa portions of operands B and C;

means for adding together the number of leading zero's in the mantissa portions of operands B and C;

means for adding together the exponent portions of operands B and C and subtracting the value of the number of leading zero's determined by said means for adding together the number of leading zero's in the mantissa portions of operands B and C to provide a predicted exponent output for the results of the operation B×C; and difference means connected to the exponent portion of operand A and said predicted exponent output for the results of the operation B×C for determining the difference between the exponents, and generating said alignment control signal, whereby either said product output from said multiply means or operand A from said register means for operand A is shifted right by an amount equal to the difference determined by said difference means.

4. Apparatus in accordance with claim 3 wherein:

said product output of said multiply means is comprised of a product sum output representing said product B×C and a product carry output representing said product B×C;

said product alignment means is comprised of a product sum alignment means connected to said product sum output and a product carry alignment means connected to said product carry output;

whereby said first arithmetic means and said product alignment means generates an aligned value output of operand A, an aligned value of said product sum output, and an aligned value of said product carry output.

5. Apparatus in accordance with claim 4 wherein said second arithmetic means includes:

carry save adder (CSA) means connected to said aligned value output of operand A, said aligned value of said product sum output, and said aligned value of said product carry output, for generating first and second CSA outputs representing the sum and carry respectively of the final results of the operation A+B×C;

carry propagate adder (CPA) means connected to said first and second CSA outputs for generating a final result output of the mantissa portion of the operation A+B×C; and post normalizing means connected to said final result output of said CPA means for normalizing the mantissa portion of said final result output of the operation A+B×C.

6. Apparatus in accordance with claim 5 wherein said second arithmetic means further includes:

post normalizing control means connected to said first and second CSA outputs and an input of said post normalizing means for generating a left shift control output to said post normalizing means operative to normalize the mantissa portion of said final result output of the operation A+B×C.

7. Apparatus in accordance with claim 6 wherein said post normalizing control means is comprised of:

post normalizing carry save adder means connected to said first and second CSA outputs for generating a propagate (XOR) output and a generate (AND) output;

OR logic means connected to said propagate and said generate output for generating a B output;

AND logic means connected to said propagate and said generate output for generating a L output;

leading zero detection means connected to said B output for generating a Z output representing the number of leading zero's in said B output;

correction means connected to said B output and said L output for generating a C output representing a correction factor; and left shift control generating means connected to said Z output and said C output for generating a left shift control output to said post normalizing means.

* * * * *